United States Patent [19]

Massie et al.

[11] Patent Number: 4,487,753

[45] Date of Patent: Dec. 11, 1984

[54] SULFUR PRODUCTION

[75] Inventors: Stephen N. Massie, Palatine; Allen R. Broyles, Buffalo Grove, both of Ill.

[73] Assignee: UOP Inc., Des Plaines, Ill.

[21] Appl. No.: 560,064

[22] Filed: Dec. 9, 1983

[51] Int. Cl.$^3$ .............................................. C01B 17/05
[52] U.S. Cl. ............................ 423/573 R; 423/573 G
[58] Field of Search .......... 423/573 G, 573 R, 574 L, 423/575

[56] References Cited

U.S. PATENT DOCUMENTS

| | | | |
|---|---|---|---|
| 3,034,865 | 5/1962 | Urban | 423/573 R |
| 3,039,855 | 6/1962 | Urban | 423/573 R |
| 3,095,276 | 6/1963 | Urban | 423/573 R |
| 3,205,164 | 9/1965 | Brown | 208/236 |
| 3,423,180 | 1/1969 | Hoekstra | 423/573 R |
| 3,956,473 | 5/1976 | Mimoun et al. | 423/573 R |
| 3,972,988 | 8/1976 | Urban | 423/571 |
| 4,036,942 | 7/1977 | Sibeud et al. | 423/573 R |
| 4,196,183 | 4/1980 | Li | 423/573 G |
| 4,358,427 | 11/1982 | Urban | 423/230 |

*Primary Examiner*—Earl C. Thomas
*Assistant Examiner*—Jeffrey E. Russel
*Attorney, Agent, or Firm*—William H. Page, II; Louis A. Morris

[57] ABSTRACT

A process for producing liquid elemental sulfur from a $CO_2$-rich gaseous stream containing $H_2S$. The gas is contacted with at least a stoichiometric amount of gaseous oxygen in the presence of liquid water with a fixed bed comprising a catalyst selected from the group consisting of a transition metal phthalocyanine compound dispersed on a support at a specific pH and temperature. A preferred support is activated carbon.

8 Claims, No Drawings

SULFUR PRODUCTION

BACKGROUND OF THE INVENTION

1. Field of the Invention

This invention relates to a process for the production of elemental liquid sulfur from $CO_2$-rich gaseous streams containing $H_2S$, such as refinery gases, natural and vent gases from natural gas processing plants, and tail gas from Claus type sulfur recovery units.

2. Description of the Background Information

One of the processes extensively used to recover elemental sulfur from $H_2S$-bearing gas streams is the Claus process. A typical Claus process involves reacting one third of the source $H_2S$ with air in a combustion chamber to form $SO_2$:

$$2H_2S + 3O_2 \rightleftharpoons 2H_2O + 2SO_2$$

$$2H_2S + SO_2 \rightleftharpoons 3S + 2H_2O$$

The remainder of the $H_2S$ is combined with the $SO_2$ formed to yield elemental sulfur vapor. The effluent from the combustion chamber is cooled, and the free sulfur is recovered as a liquid. The remaining unconverted gases are usually passed through two or three catalytic sulfur reactors to further convert the unreacted hydrogen sulfide and sulfur dioxide to free sulfur. The desulfurization afforded by the Claus process is about 90% to 97% effective in producing elemental sulfur from $H_2S$. The tail gas from a Claus unit typically contains an undesirable COS contaminant produced by the following side reactions:

$$CO_2 + H_2S \rightarrow COS + H_2O$$
$$CO + \tfrac{1}{2}S_2 \rightarrow COS$$
$$CH_4 + SO_2 \rightarrow COS + H_2O + H_2$$

Another well-known process for converting hydrogen sulfide to elemental sulfur is the Stretford process. In the Stretford process, a hydrogen sulfide-containing feed gas is treated by contacting the gas with an aqueous alkaline solution to produce an effluent gas of reduced sulfur content and to yield elemental sulfur; the solution is thereafter regenerated by contact with an oxygen-containing gas; the elemental sulfur is recovered from said solution; and the regenerated solution is recycled to the gas-contacting step.

U.S. Pat. No. 3,034,865 to P. Urban also teaches a process for converting hydrogen sulfide to elemental sulfur which comprises forming a reaction mixture of hydrogen sulfide and a basic nitrogen-compound solution and reacting the mixture with oxygen in the presence of a metal phthalocyanine catalyst.

U.S. Pat. No. 4,036,942 to Sibeud et al. discloses a process for the removal of hydrogen sulfide and alkyl mercaptans contained in liquid and gaseous streams. The subject process is a continuous and cyclic process which involves converting the hydrogen sulfide and alkyl mercaptans by catalytic oxidation using an aqueous metal chelate solution as the catalyst to form elemental sulfur and dialkyl disulfides. The metal chelate catalyst solution is recovered and recycled after separation of sulfur and dialkyl disulfides. Specifically the fluid stream containing hydrogen sulfide and alkyl mercaptans is contacted with free oxygen gas and the aqueous chelate catalyst solution in the presence of an amine. An inorganic alkali is added in an amount to adjust the pH from 6.8 to 10.

U.S. Pat. No. 3,956,473 to Mimoun et al. teaches the catalytic oxidation of hydrogen sulfide to sulfur in homogeneous liquid phase, by means of molecular oxygen, in an organic solvent whose water content is lower than 60% by volume. The liquid phase comprises a solvent selected from amides, phosphoramides, sulfoxides, nitriles and ethers. The oxidation is conducted in the presence of at least one catalyst selected from the two following categories:

a. a chelate of a transition metal selected from the group of metals consisting of iron, manganese, copper and cobalt, the chelate being selected from the group consisting of dialkyldithiocarbamates, alkylxanthates, dithiolates, 8-hydroxyquinolinates and salicylaldimines, b. a salt of such transition metal of the formula $MX_m$ in which M is the transition metal, X is an anion selected from the group consisting of Cl, Br, $ClO_4^-$, $NO_3^-$ and $SCN^-$ and m is 2 or 3.

U.S. Pat. No. 3,423,180 to J. Hoekstra pertains to the oxidation of a soluble sulfide compound. The process comprises the steps of introducing an aqueous solution of the sulfide compound together with oxygen into a reaction zone containing a solid oxidizing catalyst.

U.S. Pat. No. 3,205,164 to K. M. Brown teaches the conversion of $H_2S$ to form thiosulfate. The $H_2S$ contained in a hydrocarbon fraction is contacted with oxygen and a metal phthalocyanine catalyst in an aqueous solution, preferably an alkanolamine solution.

U.S. Pat. No. 3,039,855 to P. Urban teaches a process for oxidizing hydrogen sulfide and mercaptans to an oxidation product selected from the group consisting of elemental sulfur and disulfides which comprises reacting the sulfur compound with an oxidizing agent in the presence of a phthalocyanine catalyst at a pH of not greater than 7. Patentee carries out the oxidation of gaseous sulfur compound in several ways. When the sulfur compound is recovered as a gas, it may be passed, together with air, through a pool of a solution of the phthalocyanine catalyst at a pH of not greater than 7 or the gas may be passed upwardly through a descending solution of the phthalocyanine catalyst in a neutral or acidic medium. The gaseous sulfur compound may alternatively be passed into contact with a solid bed and the sulfur compound adsorbed on the solid bed. The solid bed may contain an oxidation catalyst or comprise a suitable adsorbent not containing the catalyst. When the adsorbent contains the catalyst, the adsorption of the sulfur compound is effected first and then air or other oxygen-containing gas introduced to effect the desired oxidation, or air is introduced along with the sulfur-containing gas and oxidation effected in one step.

U.S. Pat. No. 4,196,183 to Li discloses a process for removing $H_2S$ from geothermal steam by adding free oxygen to the steam and contacting the mixture with an activated carbon catalyst at a temperature above the saturation temperature of steam. In Li's process the $H_2S$ is oxidized to free sulfur which is absorbed on the activated carbon and which periodically must be removed therefrom. Li explains in his text that the superheating is necessary to prevent binding of active catalysts sites by moisture.

U.S. Pat. No. 3,972,988 to Urban discloses a two-stage process for obtaining free sulfur from an aqueous sulfide solution. In the first stage, the sulfide is converted to a polysulfide which is then mixed with steam and decomposed to form a mixture which might be considered analogous to geothermal steam in that it comprises vapor containing $H_2O$, $H_2S$ and $NH_3$. This vaporous mixture is then mixed with air and contacted with a metal phthalocyanine catalyst in a second stage at a pressure not greater than 20 psig to produce sulfur (which maximum pressure is stated to be the essence of the invention), and a solution of a relatively minor amount of thiosulfate compound which can be disposed of or recycled to maintain a thoroughly wetted support bed. The stated advantage to the low pressure of the second stage is that the oxidation is performed in a vaporous phase, whereas in the prior art the oxidation is performed in a liquid phase.

Finally, U.S. Pat. No. 4,358,427 to P. Urban discloses a process which is used to remove $H_2S$ from geothermal steam which geothermal steam contains less than 1,000 ppm by volume $H_2S$.

SUMMARY OF THE INVENTION

Accordingly, the present invention pertains to a process for producing elemental liquid sulfur from a $CO_2$-rich gaseous stream containing at least 0.1% $H_2S$ and less than 50% $H_2S$ by volume. In particular, the process involves contacting the gas with at least a stoichiometric amount of gaseous oxygen in the presence of liquid water with a fixed bed comprising a catalyst comprising a transition metal phthalocyanine compound dispersed on a support or an activated carbon at a pH value ranging from 1–7 and at temperatures ranging from 120° to 370° C., preferably 120°–220° C.

DESCRIPTION OF THE INVENTION

The process of the present invention affords high sulfur recovery from $CO_2$-rich feed gases containing at least 1,000 ppm (vol.) $H_2S$ in a single stage. In particular, the present invention is concerned with the conversion of $H_2S$ to elemental liquid sulfur, the $H_2S$ being present in a predominantly $CO_2$-containing gaseous stream from any source but particularly off-gas from amine acid gas plants, the off-gas containing greater than 1,000 ppm $H_2S$.

Contrary to the several stage Claus process the present single stage process provides a higher level of elemental sulfur recovery (99%+). Further, the present process does not produce the undesirable COS species that the Claus process unavoidably produces.

In contradistinction to the Stretford process, the oxidant, usually air, is introduced with the feed gas rather than in a separate step.

The present invention also differs from U.S. Pat. No. 3,034,865 in that the present invention does not require the use of a basic nitrogen-compound solution to absorb the hydrogen sulfide prior to sulfur formation in the presence of a metal phthalocyanine catalyst.

U.S. Pat. No. 4,036,942 requires the presence of an amine to prevent the formation of by-products such as thiosulfuric acid, and sulfuric acid. The present process does not require the presence of an amine.

U.S. Pat. No. 3,956,473 requires the presence of an organic solvent. The present invention does not require the use of an organic solvent.

U.S. Pat. No. 3,423,180 pertains to removing sulfides from an aqueous solution and not a $CO_2$-rich gaseous stream.

U.S. Pat. No. 3,205,164 produces thiosulfate contrary to the present process which produces sulfates as a minor by-product and liquid elemental sulfur. The advantage associated with producing sulfates is that they have no biological oxygen demand. Further, if the optional pH value is maintained for the process of the invention, the process is selective to elemental sulfur production with no detectable by-product production.

U.S. Pat. No. 3,039,855 likewise does not mention the treating of $CO_2$-rich gaseous streams. Further, there is no mention of maintaining the bed wet and recovering liquid sulfur therefrom in the water stream passed through the bed.

The practice of the present invention of maintaining a liquid water phase in the fixed bed is also in direct contradistinction to the teachings of U.S. Pat. No. 4,196,183. The subject patent recommends maintenance of superheating conditions in order to prevent moisture binding of the active catalyst sites.

The process of the present invention is also distinct from that of U.S. Pat. No. 4,358,427 in that the feed to the invention process is a $CO_2$-rich stream in contrast to geothermal steam. Since $CO_2$ is, as $H_2S$, an acid gas, it is surprising and unexpected that $H_2S$ can be removed to acceptable levels from a substantially $CO_2$-containing gas. In particular, one would expect that the acidic $CO_2$ gas present in predominant amounts would effectively compete with the $H_2S$ gas for the active sites on the catalyst and preclude an acceptable degree of $H_2S$ conversion.

U.S. Pat. No. 3,095,276, in contradistinction to the present invention process, pertains to converting $H_2S$ in an aqueous solution of a soluble salt at a pH above neutral. The reference is not concerned with $CO_2$-rich gaseous streams where the $H_2S$ is selectively converted to elemental liquid sulfur at a pH below 7.

U.S. Pat. No. 3,972,988 involves a two-stage process wherein the second oxidation zone is operated at a temperature of 115° to 125° C. The invention process is a single-step process operating at 120° C. or greater which process does not produce by-product thiosulfate.

The $CO_2$-rich streams contemplated for treatment by the present invention broadly contain between 0.1–50% by volume $H_2S$ with the balance being predominately $CO_2$. The preferred feed stream contains from 0.5–15% (5,000 to 150,000 ppm) by volume $H_2S$. The optimum feed stream suitable for $H_2S$ removal by the present invention contains 1.0 to 15.0% (10,000 to 150,000 ppm) by volume $H_2S$. As mentioned above the feed streams employed in the present invention are distinct from the geothermal streams treated in the process disclosed in U.S. Pat. No. 4,358,427. First, the amount of $H_2S$ present in the feed stream to be converted is greater than 1,000 ppm, typically about 3 to 10 volume percent. Second, since the balance of the feed stream, in contradistinction to geothermal steam, is $CO_2$, one skilled in the art would not have expected the catalyst to selectively effect acceptable conversion of $H_2S$ to sulfur in a stream in which the balance is substantially $CO_2$. It would appear that the catalytically active sites would be preferentially occupied by the $CO_2$, thereby preventing acceptable conversions of $H_2S$. Surprisingly, the process of the invention effectively treats such feed streams and converts the $H_2S$ to sulfur, wherein the residual $H_2S$ levels are 50 ppm or less. Thus the process of the invention is entirely selective in $H_2S$ conversion, the presence of other acid gases notwithstanding.

The oxygen used in the process of the invention is added to the acid gas stream in at least a stoichiometric amount (based on the formula $2H_2S + O_2 \rightarrow 2H_2O + 2S$). Air is a convenient source for the oxygen supplied when nitrogen dilution of the product stream is not a concern, otherwise pure oxygen or enriched air may be used.

Upon admixture of the acid gas with the oxygen the $H_2S$ in the gas is converted over a transition metal phthalocyanine catalyst dispersed on a carbon support or an activated carbon in the presence of liquid water.

The liquid water flow rate is dictated by the $H_2S$ content of the gas stream to be treated and the fraction of the $H_2S$ which is converted to water-soluble products, i.e., sulfates under the reaction conditions chosen. This is contrary to other wet sulfide oxidation systems which produce thiosulfate as a major by-product of the oxidation reaction. The $H_2S$ in the present invention process is converted to elemental liquid sulfur. Various sulfates, herein defined as water solubles, are produced as by-products when the pH value is not maintained within the prescribed range. Accordingly, depending on the amount of water-solubles produced, the water can be recycled with a continuous blowdown or once through with flows which maintain the desired water soluble concentrations in the liquid phase. In any event the water solubles content of the liquid water should be maintained below 25 wt. %. Preferably the water solubles levels should be maintained below 10 wt. % and optimally below 5 wt. %.

The reaction conditions employed in the process of the present invention include a temperature range of from about 120° to 370° C. and a pressure of from about 2 to 150 atmospheres absolute.

The process of the invention is carried out at a pH value range of from 1 to 7. Optimally, the process of the invention is carried out at a pH value ranging from 3.6 to 5.6. By maintaining the proper pH value the invention process achieves 99%+ conversion of the $H_2S$ to elemental liquid sulfur with no discernable by-product production. In order to maintain the proper pH for the system an alkaline agent may be added. Suitable alkaline agents include inorganic alkalis, such as an alkali metal hydroxide, e.g., sodium hydroxide, potassium hydroxide, or lithium hydroxides. Further suitable alkaline agents include $K_2CO_3$, $NaHCO_3$, $Na_2CO_3$, $NH_3$, $(NH_4)HCO_3$, etc.

The catalysts which may be used in the process of the present invention include activated carbon, such as activated wood charcoal, bone charcoal, etc., or a metal phthalocyanine such as cobalt phthalocyanine.

In particular one catalyst which may be utilized in the present invention is a metal phthalocyanine supported on a solid support such as a carbon base in concentration levels of about 0.01% to about 3 wt. %. The active ingredient itself is the metal phthalocyanine, preferably iron, cobalt, vanadium or manganese or a polymeric phthalocyanine, (Moser Thomas, "Phthalocyanine Compounds," ACS Monogram Series No. 157, page 329) derivative of these metals. The sulfonate, carboxylate or nitrate derivatives of these phthalocyanines are preferred because of their solubility properties.

With regard to the base, activated carbons having the majority of their pore diameters in the 730 angstrom size are preferred. Also preferred are carbons having a bulk density of less than 0.55 grams/cc, a pore volume greater than 0.3 cc/gram, being derived from lignin, lignite, peat or coal and having a capacity to retain oxygen in an available form. Examples of these carbons are Norit PKDA, Calgon's Types BPL and CPG and West Virginia's Pulp and Paper Company's type WVW. Especially preferred are carbons containing heavy metals as natural constituents, such as the Darco carbons, containing as much as 1% iron, iron being the most preferred metal. The Darco carbons are produced by Atlas Chemical Industries. Although the activated carbons are preferred, amorphous carbons can be used as a support where pressure drop through the catalyst bed becomes a major factor for upstream treating. The maximum permitted pressure drop is considered to be about 5 psi. The carbons may be in a granular form for fixed bed operation or as a powder for slurry operation.

The following examples are given to illustrate the further novelty, mode of operation and ability of the present invention. The examples are not intended to unduly limit the present invention but are intended to be illustrative rather than restrictive.

EXAMPLE I

The present example demonstrates the efficacy of the present invention with regard to converting $H_2S$ from an acid gas stream containing 2.5 volume % $H_2S$ and 97.5 volume % $CO_2$ to liquid sulfur.

The acid gas feed stream, liquid water, and air were passed over a cobalt phthalocyanine disulfonate catalyst disposed upon a Darco carbon support. The carbon support contained the dispersed catalyst at a concentration level of 0.15 wt. %.

The pressure in the reaction zone was maintained at about 115 to 125 psig.

Several tests of the invention were carried out with varying reaction zone conditions in each case.

The pH value in each test was maintained at 6.0–6.3. Appended Table I sets forth the reaction zone conditions and results of the tests.

TABLE I

| Test No. | $CO_2/H_2S$ Flow SCFH | Air Flow SCFH | O/S Molar Ratio | Water Flow Gallon Per Hour | T Reactor Inlet °C. | T Reactor Outlet °C. | Outlet Gas $H_2S$ Content ppm |
|---|---|---|---|---|---|---|---|
| 1 | 22.8 | 2.32 | 1.7 | 2.86 | 132 | 115 | 1700 |
| 2 | 17.8 | 3.9 | 3.5 | 2.86 | 132 | 115 | 70 |
| 3 | 14.3 | 5.3 | 5.9 | | | | negligible |
| 4 | 60.3 | 7.53 | 2.0 | | 132 | 124 | 4000 |

EXAMPLE II

The present example sets out the results obtained from a six hour test period of carrying out the process of the invention.

The conditions prevailing during the course of the test period include the following:

| | |
|---|---|
| Catalyst: | 6.5 cubic feet of cobalt phthalocyanine disulfonate catalyst disposed on a Darco carbon support. |
| Temperature: | 121° C. to 135° C. |
| Water recycle rate: | 0.6 ppm |
| pH: | 6.0–6.3 |
| Gas Feed: | 85,000 cubic feet/Day $CO_2$ containing 1.6 to 1.9 mole % $H_2S$ |
| Air: | 1.3 to 1.6 moles oxygen (air derived) per mole $H_2S$ |

| -continued | |
|---|---|
| Exit Gas: | Negligible H$_2$S content. |

Table II below sets out certain pertinent information from the test period.

TABLE II

| Time (Hours) | Leco Sulfur (wt. %) | Na+ (wt. %) |
|---|---|---|
| 1 | 0.15 | 0.24 |
| 14.8 | 0.15 | 0.23 |
| 18.7 | 0.15 | 0.23 |

"Leco Sulfur" designates a method of determining total sulfur content in organic and inorganic materials. Briefly, the method involves burning a weighed sample in an induction furnace in a stream of oxygen. The products of combustion are passed into an adsorber containing sodium azide, potassium iodide, hydrochloric acid, starch and an excess of free iodine which, in the presence of starch, gives the solution of blue tint. Sulfur dioxide in the combustion gases consumes the free iodine, bleaching the solution. The iodate reacts with iodide and acid, releasing free iodine. These reactions continue simultaneously until no more sulfur dioxide is produced, whereupon the solution regains its original blue tint and no further titration occurs. The volume of titrant consumed is a measure of the total sulfur present in the sample.

The fact that the Leco sulfur content of the water was constant indicates that there was no conversion to thiosulfate or sulfate and that all of the H$_2$S was converted to elemental nonsoluble liquid sulfur. The constant Na+ content indicates a constant water inventory for the system. When the pH value was varied to 6.0 to 6.5 sulfate became a by-product of the oxidation reaction; 0.44 grams SO$_4^=$ per 100 cc water. When the pH of the system was raised to a value of 7 the Leco sulfur content rose to 0.31 wt. %. The sodium ion concentration also rose to 0.53 wt. % indicating conversion to by-product sulfate species.

We claim as our invention:

1. A process for producing liquid elemental sulfur from a gaseous feed stream containing from 0.1% to 50% H$_2$S and having a predominant amount of CO$_2$ by volume, which process comprises contacting said gas with at least a stoichiometric amount of gaseous oxygen in the presence of liquid water and a catalyst comprising a transition metal phthalocyanine compound dispersed on a fixed bed support, at a pH value ranging from 1 to 7, a temperature ranging from 120° to 370° C. and a pressure of from about 2 to 150 atmospheres absolute to selectively convert said H$_2$S to liquid elemental sulfur.

2. The process of claim 1 wherein at least a portion of the liquid water is recycled to the process.

3. The process of claim 2 wherein the liquid water contains less than 25 wt. % water soluble content.

4. The process of claim 1 wherein the metal phthalocyanine comprises iron, cobalt, vanadium or manganese phthalocyanine or a polymeric phthalocyanine derivative thereof.

5. The process of claim 1 wherein the metal phthalocyanine comprises sulfonate, carboxylate or nitrate derivatives of the phthalocyanine.

6. The process of claim 1 wherein an alkaline agent is added to the water to control the pH.

7. The process of claim 1 wherein the pH value ranges from 3.6 to 5.6.

8. The process of claim 1 wherein said support comprises activated carbon.

* * * * *